Jan. 2, 1923.
H. R. PATTERSON.
ELECTRIC POWER PLANT
FILED SEPT. 10, 1919
1,440,551
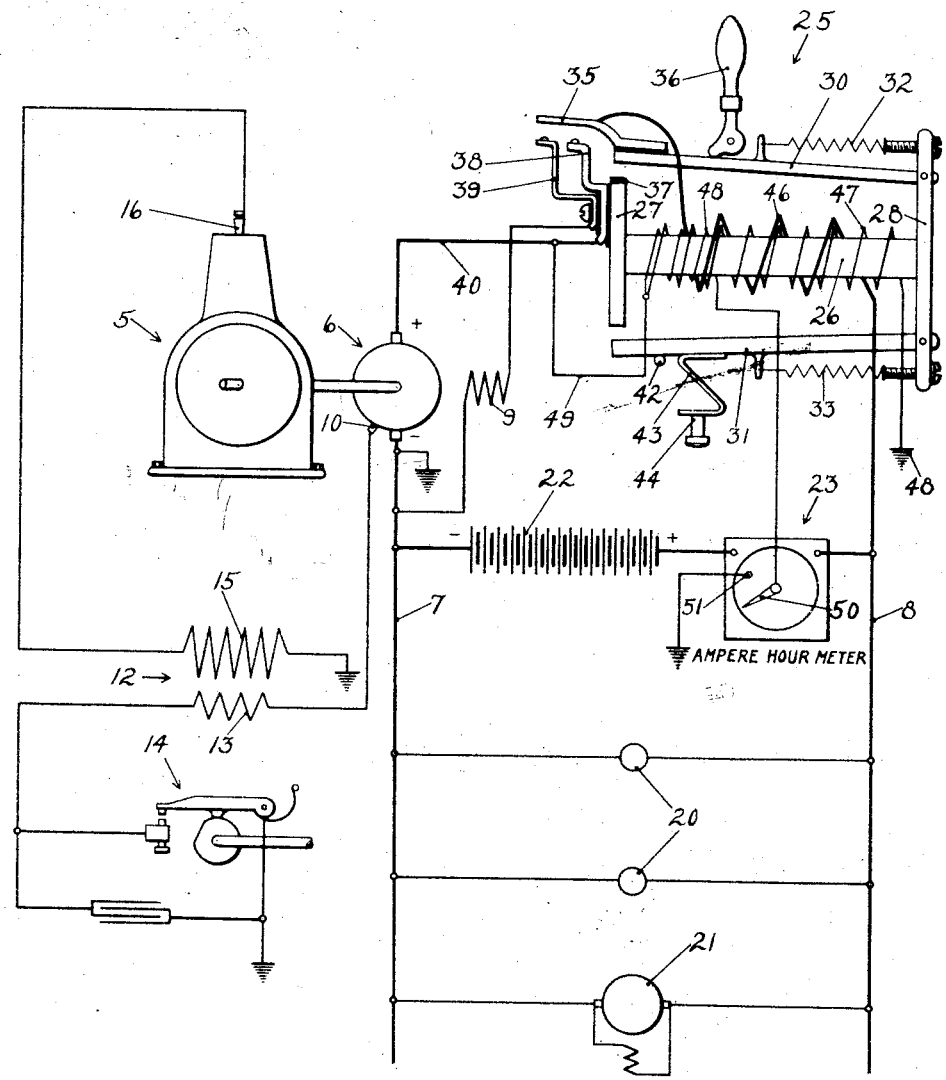
INVENTOR.
Harry R. Patterson.
BY
Chester H Braselton
ATTORNEYS.

Patented Jan. 2, 1923.

1,440,551

UNITED STATES PATENT OFFICE.

HARRY R. PATTERSON, OF TOLEDO, OHIO.

ELECTRIC POWER PLANT.

Application filed September 10, 1919. Serial No. 322,732.

*To all whom it may concern:*

Be it known that I, HARRY R. PATTERSON, a citizen of the United States, residing at Toledo, in the county of Lucas and State of Ohio, have invented certain new and useful Improvements in Electric Power Plants, of which I declare the following to be a full, clear, and exact description.

This invention relates to electric power plants which comprise an internal combustion engine, a dynamo electric machine driven thereby and connected to charge a storage battery, manually operated control apparatus for inaugurating the charge and automatic means for limiting the amount of charge given to the battery.

With that device in the hands of a careless or ignorant person there is a possibility under a certain peculiar combination of circumstances that the battery might be seriously depleted and the dynamo electric machine injured by excessive current. Such a condition might arise if the starting lever were to be operated intentionally or accidentally after the engine had been automatically stopped and before the battery had discharged an appreciable amount and if the engine should refuse to run as through lack of fuel. Under such circumstances the dynamo electric machine might, if proper steps were not taken to open the starting circuit, continue in its effort to start the engine thereby dissipating the battery and endangering itself from excessive current.

An object of my invention is to provide an improved system of the nature indicated above which shall be free from complicated and delicate parts, simple to operate and at the same time shall be positive and reliable in its operation.

Another object is to provide a system which can, under no circumstances, do itself injury under the conditions outlined above.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawing forming a part thereof, in which:

The single figure of the drawing is a diagrammatic showing of my invention.

On the drawing an internal combustion engine 5 is shown directly connected with a dynamo electric machine 6 whose main brushes are connected with the main circuit wires 7 and 8 and which has the shunt field winding 9 and a third brush 10. From this third brush is taken ignition current for the engine, the ignition system being that in common use comprising an induction coil 12 the primary 13 of which is connected to the third brush 10 and to a cam driven interrupter 14 while the secondary 15 connects with the spark plug 16 of the engine.

Connected across the main circuit wires 7 and 8 are shown translating devices such as electric lights 20 and a motor 21. Also connected across these circuit wires is shown a storage battery 22 in series with an ampere hour meter 23.

Arranged in series with the circuit wire 8 is an electromagnetic switch 25 having a core 26 between end heads 27 and 28. Pivoted to the end head 28 are two armatures 30 and 31 held away from the head 27 by adjustable coil springs 32 and 33 respectively. The armature 30 carries at its end but insulated therefrom a contact member 35 and is adapted to be moved by a hand lever 36 toward the head 27 but is prevented from actual contact therewith by a non-magnetic spacer 37. The end head 27 carries two contact members 38 and 39 each adapted to contact with member 35 but insulated from each other and from the head 27. The contact member 38 connects directly with one main brush of the machine 6 through wire 40 while the other contact member 39 connects with the shunt field winding 9. The armature 31 preferably is constructed to have a lower reluctance than the armature 30 and in its normal position rests against a stop 42. This armature carries a Z-shaped member 43 against which engages a push button 44. The armature 31 unlike the armature 30 may, in its closed circuit position, contact directly with the end head 27. The core 26 carries three windings, a series or current winding 46, a potential or shunt winding 47 and a second potential or shunt winding 48. The current winding 46 has one end connected to the wire 8 and the other end connected to the contact member 35 whereby it is traversed by the entire charging and starting current. The two potential windings 47 and 48 are both connected by the wire 49 with the wire 40, the former being permanently grounded at 48 while the latter is adapted to be grounded by the switch 50 of the ampere hour meter contacting with the grounded contact 51.

The operation of the device is as follows:—

Suppose, with the engine still and the switch and ampere hour meter in the position illustrated in the drawing, it is desired to charge the battery. The hand lever 36 would be rocked to depress armature 30 to close the shunt field circuit and the main circuit. Current from the battery will thereupon flow through the ampere hour meter, the electromagnetic switch, the shunt field winding and the armature of the dynamo electric machine whereby this machine will operate as a motor to turn over the engine. A suitable E. M. F. will also be supplied from the third brush 10 to the ignition system of the engine. The lever 36 will be held in rocked position until the engine begins to operate under its own power and reaches normal speed when the current will flow from the dynamo electric machine, now acting as a generator, to charge the battery. The flux due to the potential winding 47 and the series winding 46 will hold the armature 30 in its closed circuit position but will not be sufficient to move the armature 31. At the completion of the charge, the switch 50 will touch the grounded contact 51 and thereby will close the circuit of the potential winding 48. Since this winding 48 is wound to have a cumulative effect the additional flux arising therefrom will be sufficient to overcome the tension of spring 33 and attract the armature 31. This armature 31 being of lower reluctance than armature 30 and being permitted to come into direct contact with the head 27 will provide a relative low reluctance shunt path for the flux previously traversing armature 30. The armature 30 will thereby move to release position opening the main charging circuit as well as the shunt field circuit. The generator E. M. F. will quickly fall to a value too low to provide proper ignition when the engine will accordingly come to rest and the system will thus automatically resume the condition with which the description of the operation was started.

Should it be desired to stop the charge manually the push button 44 may be operated to cause the armatures 31 and 30 to function in the manner just described to open the shunt field and charging circuits. It is preferable to so adjust the switch 25 that the field circuit is closed first.

As current is drawn from the battery by the translating devices the ampere hour meter operates in the opposite direction from what it did on charge and the contact member will accordingly move away from the grounded contact and remain out of contact therewith until the battery has again been given a full charge.

Having thus described my invention, what I claim as new and desire to secure by Letters Patent, is:

1. In a system of the class described the combination of a dynamo electric machine, a battery connected to be charged thereby, an electromagnetic switch in said charging circuit said switch having a current winding and a first potential winding for holding said switch closed during the charging of the battery and a second potential winding all cumulative in their effect, an ampere hour meter in said charging circuit having a switch adapted to close the circuit of said second potential winding after the battery has received a predetermined charge, and means for causing said electro-magnetic switch to open when the circuit of said second potential winding is closed.

2. In a system of the class described the combination of a dynamo electric machine, a battery connected to be charged thereby, an electromagnetic switch in said charging circuit having a current winding and having an armature carrying a switch contact, a second armature of relatively low reluctance adapted to provide a shunt path for the flux of said switch, a potential winding for said switch and an ampere hour meter in said charging circuit constructed to close the circuit of said potential winding after the battery has received a predetermined charge, the two windings being cumulatively wound whereby when the potential winding is energized the second armature is attracted permitting the release of the first mentioned armature carrying the switch contact.

3. In a system of the class described the combination of a dynamo electric machine, a battery in circuit to be charged thereby, an ampere hour meter in series with the battery, an electromagnetic switch in said charging circuit having a current winding and having an armature carrying a switch contact, a second armature of lower reluctance than said first armature adapted when operated to shunt the flux from said first armature and permit its return to open circuit position, two potential windings for said switch, said ampere hour meter having a switch for closing the circuit of one of said potential windings, all of said windings being cumulatively wound whereby when the ampere hour meter switch is closed the electromagnetic switch is opened.

4. In a device of the class described the combination of an internal combustion engine having an ignition system, a dynamo electric machine having a shunt field circuit driven thereby and connected to said ignition system, a storage battery in circuit to be charged thereby and to operate said dynamo electric machine as a motor to start the engine, an ampere hour meter in series with the battery, a switch controlled thereby, an electromagnetic switch for controlling said battery circuit and said field circuit, said switch having a contact carrying armature and a second armature of relatively lower reluctance, a current winding and two potential windings for said switch connected to have a cumulative effect when the battery is being charged, one of said potential windings being connected to be controlled by said first mentioned switch.

5. In a system of the class described, the combination of an internal combustion engine, a dynamo-electric machine driven thereby having a field circuit, a battery connected to be charged from said machine, switch means for opening said charging circuit and said field circuit after the passage of a predetermined amount of electricity into said battery, and an ignition system for said engine connected to receive current from said machine independently of said switch means.

6. In a system of the class described, the combination of an internal combustion engine, a generator connected to be driven thereby having a shunt field winding and a third brush for supplying ignition current, a storage battery adapted to be charged by said generator, an electro-magnetic switch for controlling the current taken by said battery and by said field winding, an ignition system for said engine connected to said third brush and an ampere hour meter in series with said battery for controlling the operation of said switch whereby when the battery is fully charged the generator field circuit is opened and the engine stops due to insufficient ignition current.

7. In a system of the class described, the combination of a generator, a battery connected to be charged thereby, an electro-magnetic switch in said charging circuit having a cummulatively wound series and shunt winding for holding said switch closed during the charging of the battery, means responsive to the amount of current received by said battery for causing an increase in flux of said electro-magnetic switch and means controlled by said increase in flux for causing the release of said switch.

8. In a system of the class described, the combination of a dynamo-electric machine, a battery connected to be charged thereby, an electro-magnetic switch in said charging circuit, said switch having a plurality of windings cumulatively wound, one of said windings being connected to be excited during the charging of the battery, means responsive to the charged condition of said battery for closing the circuit of the other of said windings, and means responsive to the combined flux of said windings for causing said switch to open.

9. In a system of the class described, the combination of a dynamo-electric machine, a battery connected to be charged thereby, an electro-magnetic switch in said charging circuit having a current winding, a first potential winding to normally hold said switch closed during the charging function and a second potential winding the normal effect of said windings being cumulative, means responsive to a pre-determined charged condition of said battery for closing the circuit of said second potential winding, and means whereby the combined flux of said three windings causes said switch to open.

10. In a system of the class described, the combination of a dynamo-electric machine, a battery connected to be charged thereby, an electro-magnetic switch in said charging circuit, said switch having a winding traversed by the charging current, a winding connected across the terminals of said dynamo-electric machine and acting cummulatively with said first winding and a third winding also commulative in its effect and connected across said machine, means responsive to the passage of a predetermined amount of electricity into said battery for closing the circuit of said third winding and means responsive to the combined flux of said three windings for causing said switch to open said charging circuit.

In testimony whereof, I affix my signature.

HARRY R. PATTERSON.